A. JACKSON & R. IRWIN.
Levelers, Pulverizers, and Corn-Planters.

No. 155,311.             Patented Sept. 22, 1874.

WITNESSES=
Philip W. Hale,
Parker H. Sweet Jr.

INVENTORS
Alexander Jackson
Richard Irwin,
per Richards & Hale,
Attorneys.

UNITED STATES PATENT OFFICE.

ALEXANDER JACKSON AND RICHARD IRWIN, OF MORTONSVILLE, IND.

IMPROVEMENT IN LEVELERS, PULVERIZERS, AND CORN-PLANTERS.

Specification forming part of Letters Patent No. 155,311, dated September 22, 1874; application filed July 3, 1874.

*To all whom it may concern:*

Be it known that we, ALEXANDER JACKSON and RICHARD IRWIN, of Mortonsville, in the county of Clinton and State of Indiana, have invented certain new and useful Improvements in Combined Leveler, and Pulverizer, and Corn-Planter; and we do hereby declare that the following is a full, clear, and exact description thereof, which will enable others skilled in the art to which it pertains to make and use the same, reference being had to the accompanying drawings and to the letters of reference marked thereon, which form a part of this specification.

Our invention consists in arranging forward of a corn-planter a leveler and pulverizer of peculiar construction, which will be hereinafter fully described.

Figure 1:
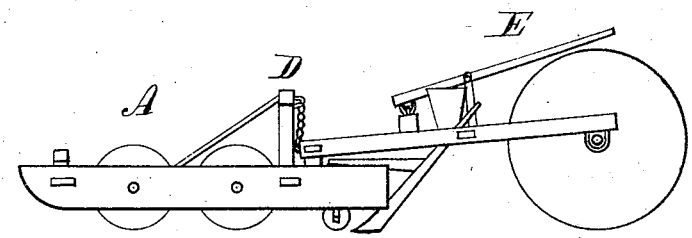
Figure 2:
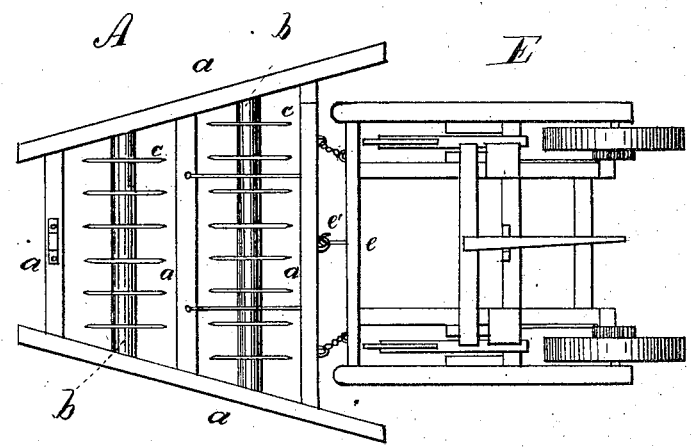

In the drawing, Figure 1 is a side elevation of our improved combined implement. Fig. 2 is a plan view of same.

A is the leveler and pulverizer, composed of the beams $a\ a\ a\ a$ and shafts $b\ b$, upon which are arranged series of cutting wheels or disks $c\ c$. D is an upright frame, mounted on the hindmost beam of the leveler. To the top piece of this frame the planter is hitched. E is the corn-planter, upon which we make no separate claims at present. To the front beam $e$ of the planter is attached a hook, $e'$, which hooks into a staple in the top piece of the upright frame D, when the planter, and leveler, and pulverizer are hitched together for working. Stay-chains may also be used for connecting the leveler and planter on each side of hook $e'$.

When our combined implement is in use, the horses are hitched to the narrow front end of the leveler, the beams $a\ a\ a\ a$ of which rest upon and are dragged over the ground, leveling the surface in front of the planter, while the cutting-wheels pulverize clods, and by cutting into the ground put it into such condition that the planter-plows following behind may easily make the furrows into which are dropped the seed.

Having now fully described the construction and operation of our invention, we claim and desire to secure by Letters Patent—

1. The combination of leveling-beams $a\ a\ a\ a\ a$, arranged, as shown, to rest upon the ground, axles or shafts $b\ b$, and series of cutting-wheels $c\ c$, substantially as and for the purpose described.

2. The combination of leveler and pulverizer A, consisting of beams $a\ a\ a\ a$, shafts $b\ b$, and cutting-wheels $c\ c$, with the corn-planter E, flexibly attached thereto, substantially as shown and described.

In testimony that we claim the foregoing as our own invention we affix hereto our signatures in presence of two witnesses.

ALEXANDER JACKSON.
   RICHARD IRWIN.

Witnesses:
 PERRY W. GARD,
 GEORGE W. CAMPBELL.